(12) United States Patent
Biskeborn et al.

(10) Patent No.: US 8,611,043 B2
(45) Date of Patent: Dec. 17, 2013

(54) MAGNETIC HEAD HAVING POLYCRYSTALLINE COATING

(75) Inventors: Robert G. Biskeborn, Hollister, CA (US); Calvin S. Lo, Saratoga, CA (US); Teya Topuria, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 13/152,247

(22) Filed: Jun. 2, 2011

(65) Prior Publication Data

US 2012/0307396 A1    Dec. 6, 2012

(51) Int. Cl.
  *G11B 5/39*    (2006.01)

(52) U.S. Cl.
  USPC ......................................... 360/110

(58) Field of Classification Search
  USPC ......................................... 360/110
  See application file for complete search history.

(56) References Cited

U.S. PATENT DOCUMENTS

| | | | |
|---|---|---|---|
| 4,659,606 A | | 4/1987 | Wada et al. |
| 5,074,971 A | | 12/1991 | Tsuya et al. |
| 5,165,981 A | * | 11/1992 | Yamakawa et al. ............ 428/141 |
| 5,209,837 A | | 5/1993 | Tsuya et al. |
| 5,323,282 A | | 6/1994 | Kanai et al. |
| 5,572,391 A | | 11/1996 | Ishiwata |
| 5,710,683 A | | 1/1998 | Sundaram |
| 5,781,376 A | | 7/1998 | Tsukamoto |
| 5,906,884 A | | 5/1999 | Yahisa et al. |
| 6,172,858 B1 | | 1/2001 | Yoda et al. |
| 6,188,543 B1 | | 2/2001 | Terunuma et al. |
| 6,361,837 B2 | | 3/2002 | Pangrle et al. |
| 6,365,286 B1 | | 4/2002 | Inomata et al. |
| 6,721,142 B1 | * | 4/2004 | Meyer et al. ................ 360/324.1 |
| 6,759,081 B2 | | 7/2004 | Huganen et al. |
| 6,822,831 B2 | | 11/2004 | Ikeda et al. |
| 6,846,434 B2 | | 1/2005 | Akselrod |
| 6,849,305 B2 | | 2/2005 | Bravo-Vasquez et al. |
| 6,879,470 B2 | | 4/2005 | Johnson et al. |
| 7,469,465 B2 | | 12/2008 | Ding et al. |
| 7,580,227 B2 | | 8/2009 | Sato et al. |
| 7,676,904 B2 | | 3/2010 | Chau et al. |
| 8,149,537 B2 | * | 4/2012 | Nazarov ..................... 360/125.3 |
| 8,238,062 B2 | * | 8/2012 | Chen et al. ..................... 360/321 |
| 8,397,998 B1 | * | 3/2013 | Mann et al. ................... 235/493 |
| 2001/0021089 A1 | | 9/2001 | Miyauchi et al. |
| 2002/0018920 A1 | | 2/2002 | Yamamoto et al. |

(Continued)

OTHER PUBLICATIONS

U.S. Appl. No. 12/831,149, filed Jul. 6, 2010.

(Continued)

*Primary Examiner* — Mark Blouin
(74) *Attorney, Agent, or Firm* — Zilka-Kotab, PC

(57) ABSTRACT

A magnetic head according to one embodiment includes a substrate; an array of transducers formed on the substrate, wherein the transducers and substrate form portions of a magnetic media facing surface; and an at least partially polycrystalline dielectric layer on the media facing surface, wherein the at least partially polycrystalline dielectric layer is on a magnetic film of at least one of the transducers in the array. A method for forming an at least partially polycrystalline dielectric layer on a media facing surface of a magnetic head according to one embodiment includes forming an at least partially polycrystalline dielectric layer on an array of transducers of a magnetic head, wherein an oxide layer is formed above at least some of the magnetic layers before and/or during the forming of the at least partially polycrystalline dielectric layer.

19 Claims, 9 Drawing Sheets

(56) References Cited

U.S. PATENT DOCUMENTS

| | | |
|---|---|---|
| 2002/0098381 A1 | 7/2002 | Coffey et al. |
| 2004/0084408 A1 | 5/2004 | Makarov et al. |
| 2005/0110004 A1 | 5/2005 | Parkin et al. |
| 2006/0034022 A1 | 2/2006 | Fukuzawa et al. |
| 2006/0078683 A1 | 4/2006 | Mukai |
| 2006/0232883 A1* | 10/2006 | Biskeborn et al. ............ 360/129 |
| 2007/0009717 A1 | 1/2007 | Wong |
| 2007/0236837 A1 | 10/2007 | Chen et al. |
| 2009/0244772 A1 | 10/2009 | Sue et al. |
| 2010/0053817 A1 | 3/2010 | Biskeborn et al. |
| 2011/0056825 A1 | 3/2011 | Baubet et al. |
| 2011/0102947 A1 | 5/2011 | Ogawa et al. |
| 2012/0170170 A1* | 7/2012 | Gros-Jean .................... 361/313 |

OTHER PUBLICATIONS

Non-Final Office Action Summary from U.S. Appl. No. 12/204,671 dated Aug. 16, 2011.

Examiner's Answer from U.S. Appl. No. 12/204,671 dated Aug. 27, 2012.

Final Office Action from U.S. Appl. No. 12/204,671 dated Feb. 12, 2013.

Final Office Action Summary from U.S. Appl. No. 12/204,671 dated Jan. 13, 2012.

Restriction/Election Requirement from U.S. Appl. No. 12/204,671 dated Jun. 30, 2011.

Non-Final Office Action from U.S. Appl. No. 12/204,671 dated Jun. 24, 2013.

* cited by examiner

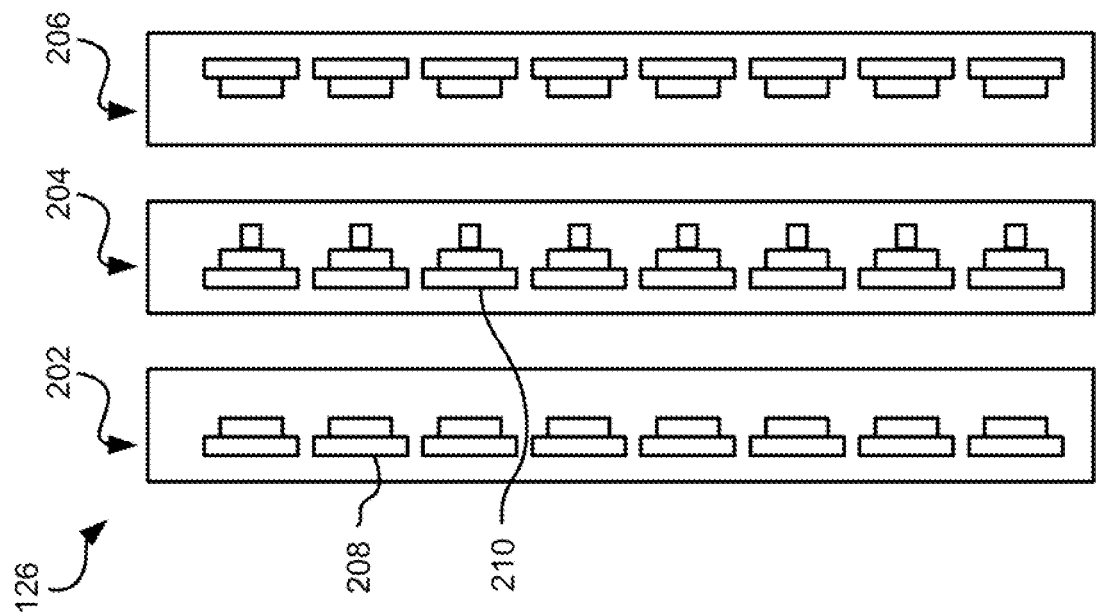
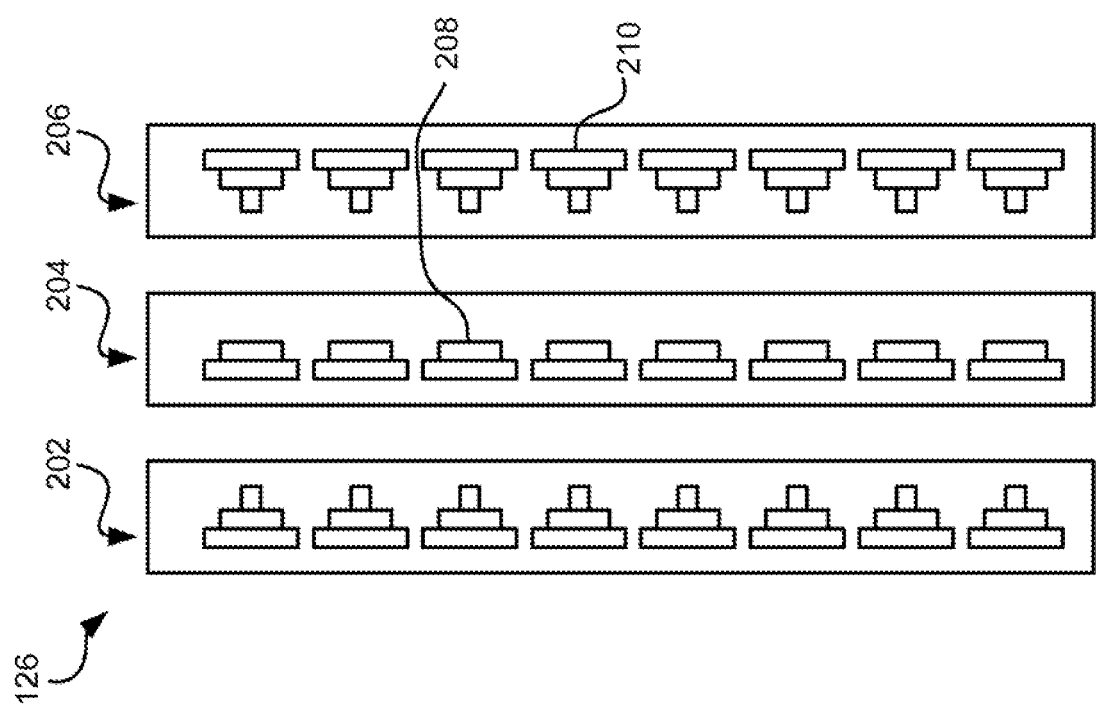

MAGNETIC HEAD HAVING POLYCRYSTALLINE COATING

BACKGROUND

The present invention relates to data storage systems, and more particularly, this invention relates to magnetic heads.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

BRIEF SUMMARY

A magnetic head according to one embodiment includes a substrate; an array of transducers formed on the substrate, wherein the transducers and substrate form portions of a magnetic media facing surface; and an at least partially polycrystalline dielectric layer on the media facing surface, wherein the at least partially polycrystalline dielectric layer is on a magnetic film of at least one of the transducers in the array.

A magnetic head according to one embodiment includes a substrate having a media facing surface; an array of transducers formed on the substrate, at least some layers of the transducers being recessed from the media bearing surface; and an at least partially polycrystalline dielectric layer above the array of transducers, wherein portions of the transducers adjacent the at least partially polycrystalline dielectric layer have iron oxide and reaction products of a thermite-like reaction.

A method for forming an at least partially polycrystalline dielectric layer on a media facing surface of a magnetic head according to one embodiment includes forming an at least partially polycrystalline dielectric layer on an array of transducers of a magnetic head, wherein an oxide layer is formed above at least some of the magnetic layers before and/or during the forming of the at least partially polycrystalline dielectric layer.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a magnetic head includes a substrate; an array of transducers formed on the substrate, wherein the transducers and substrate form portions of a magnetic media facing surface; and an at least partially polycrystalline dielectric layer on the media facing surface, wherein the at least partially polycrystalline dielectric layer is on a magnetic film of at least one of the transducers in the array.

In one general embodiment, a magnetic head includes a substrate having a media facing surface; an array of transducers formed on the substrate, at least some layers of the transducers being recessed from the media bearing surface; and an at least partially polycrystalline dielectric layer above the array of transducers, wherein portions of the transducers adjacent the at least partially polycrystalline dielectric layer have iron oxide and reaction products of a thermite-like reaction.

In one general embodiment, a method for forming an at least partially polycrystalline dielectric layer on a media facing surface of a magnetic head includes forming an at least partially polycrystalline dielectric layer on an array of transducers of a magnetic head, wherein an oxide layer is formed above at least some of the magnetic layers before and/or during the forming of the at least partially polycrystalline dielectric layer.

Figure 1:
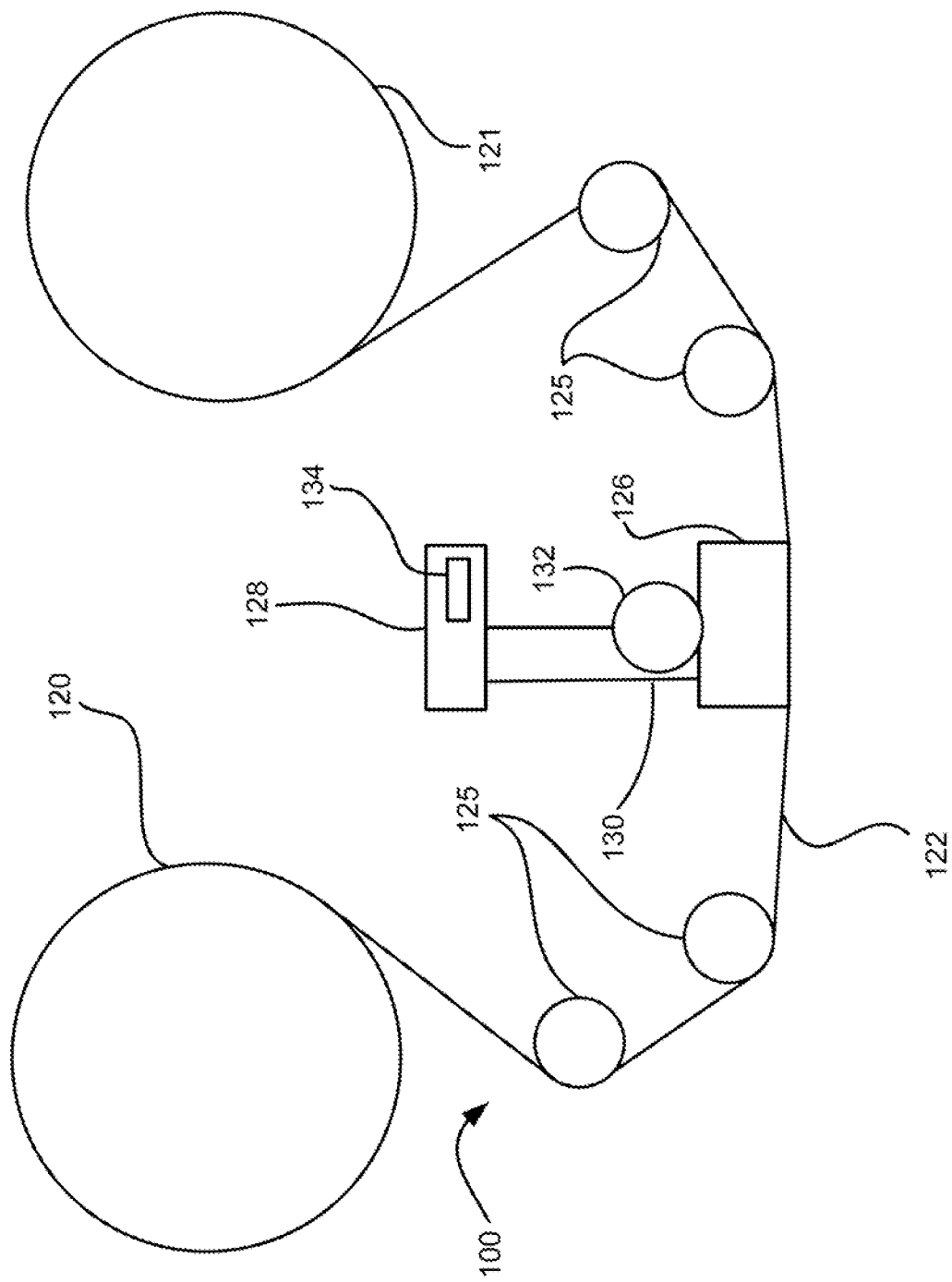
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
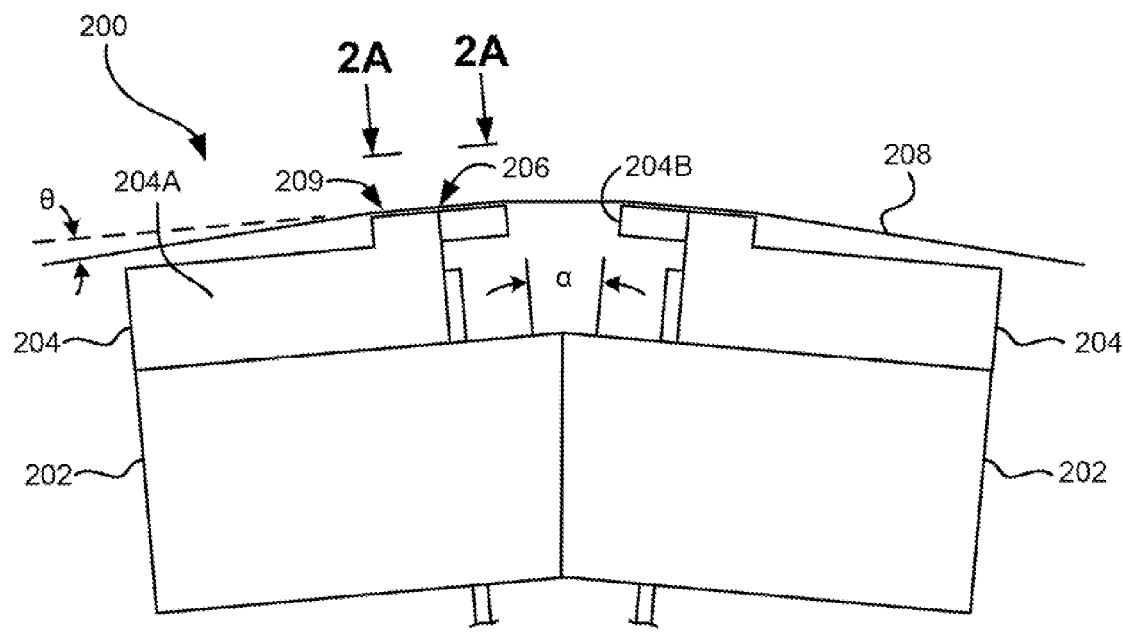
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo track readers for reading servo data on the medium.

Figure 2A:
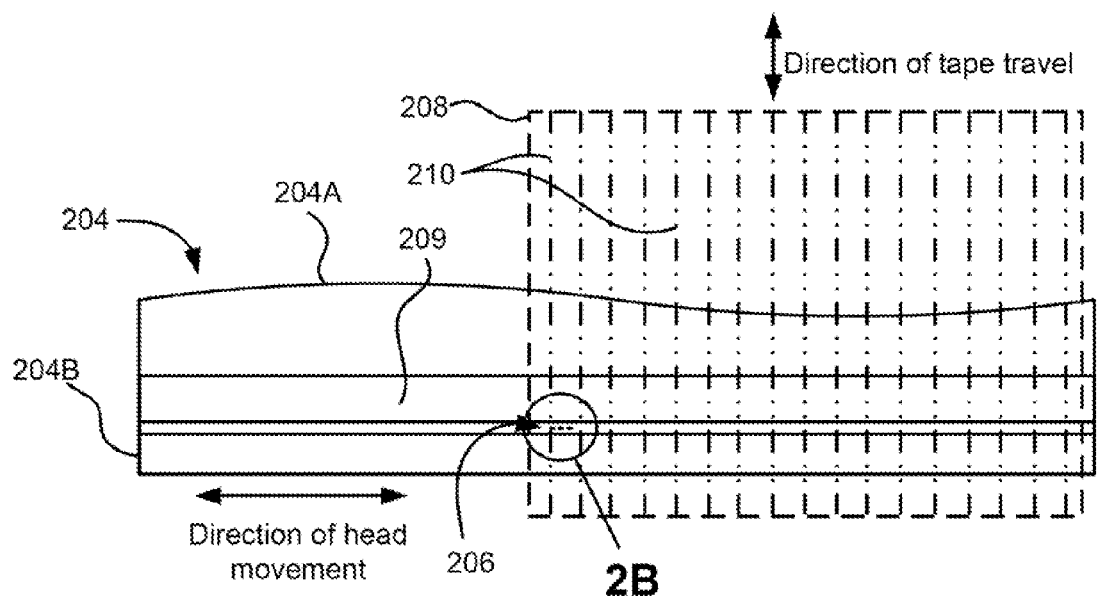
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 512 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
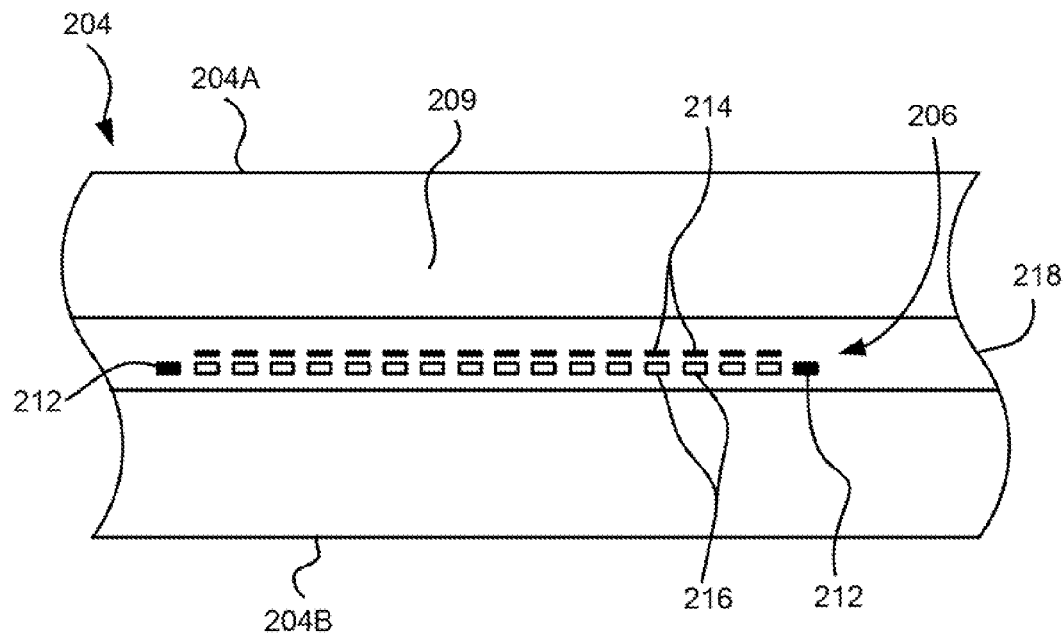
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
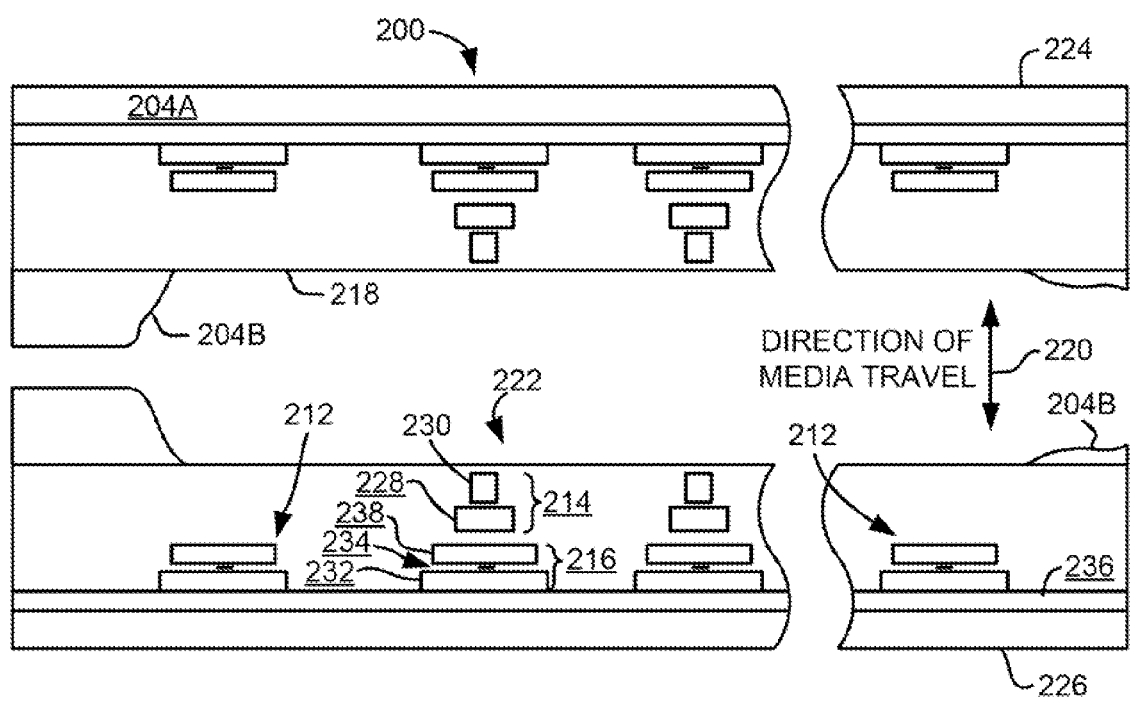
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 202, 206 each include one or more arrays of writers 210. The inner module 204 of FIG. 3 includes one or more arrays of readers 208 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
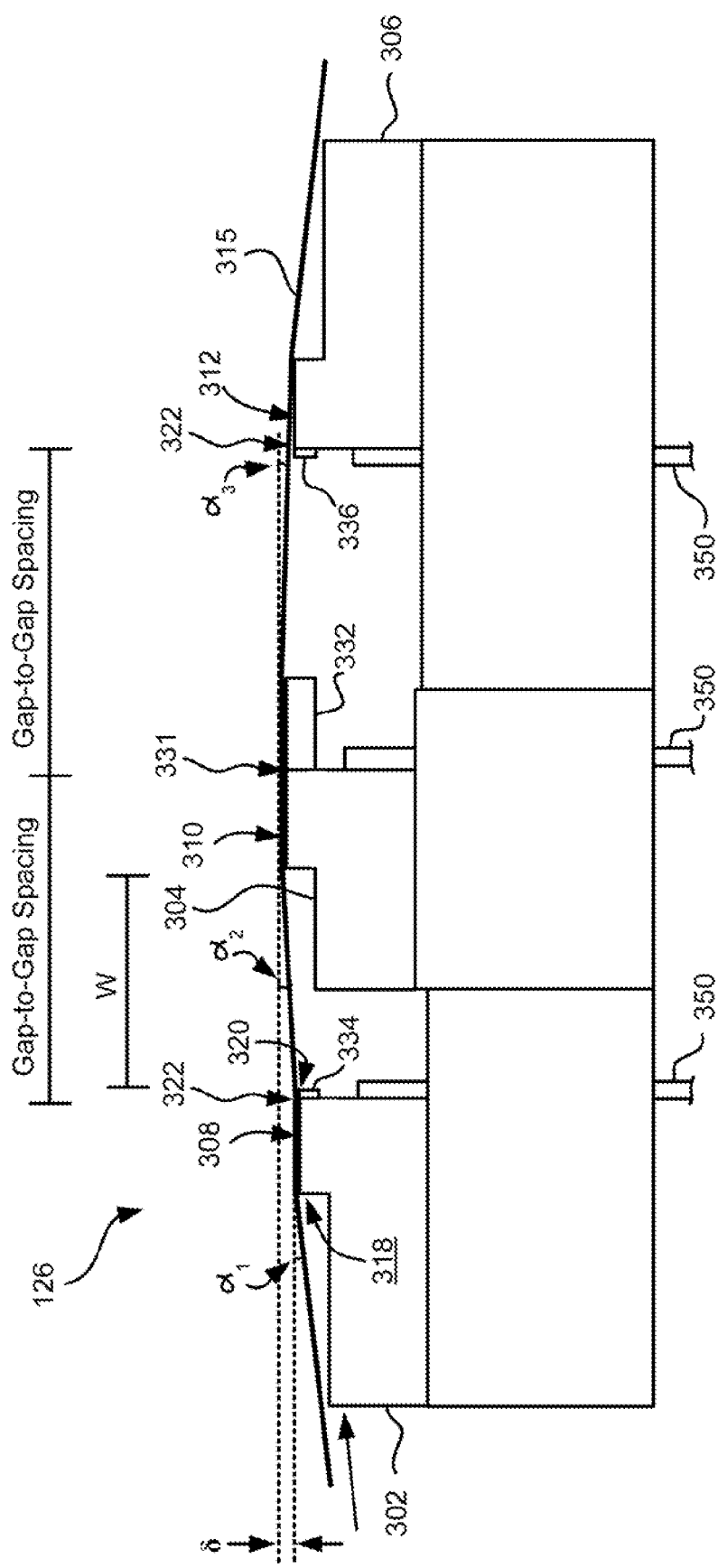
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
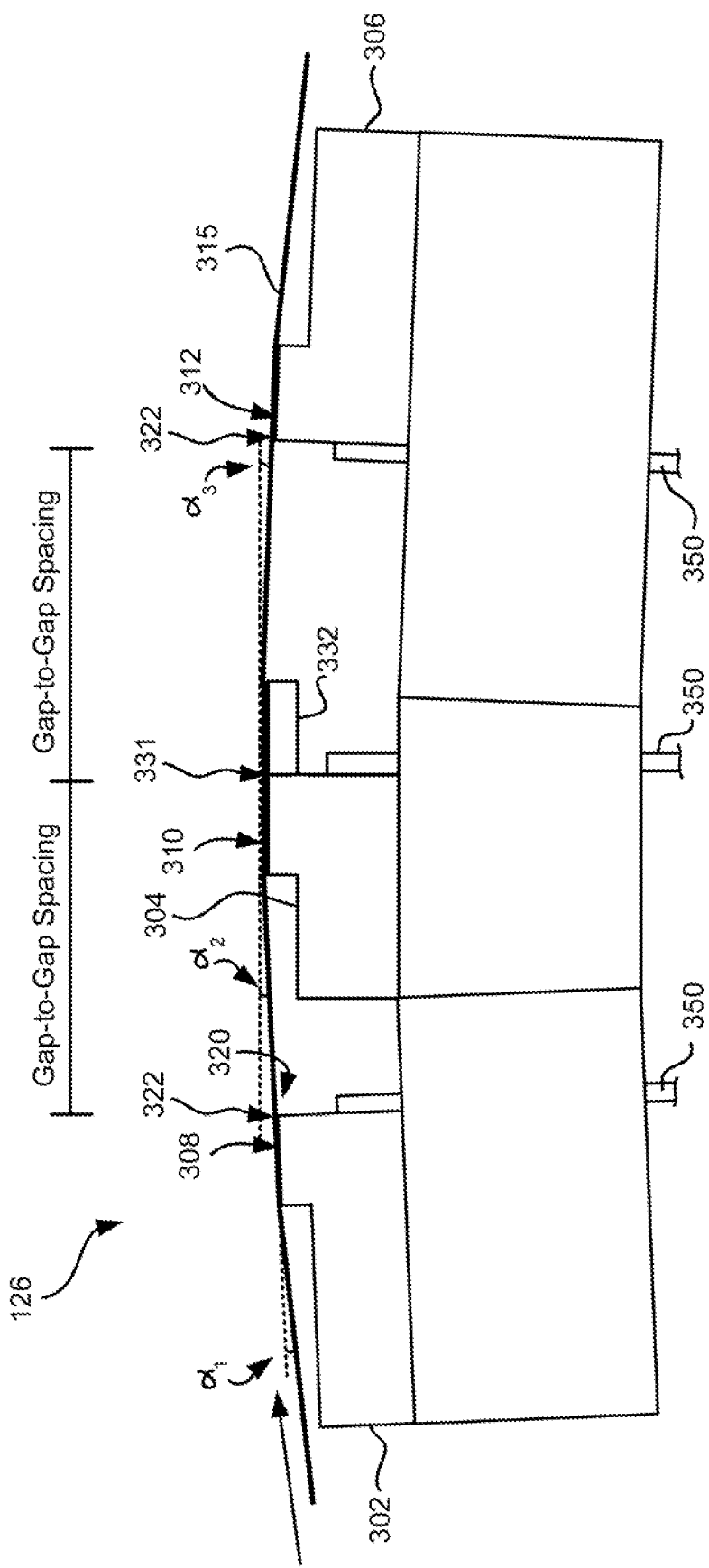
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
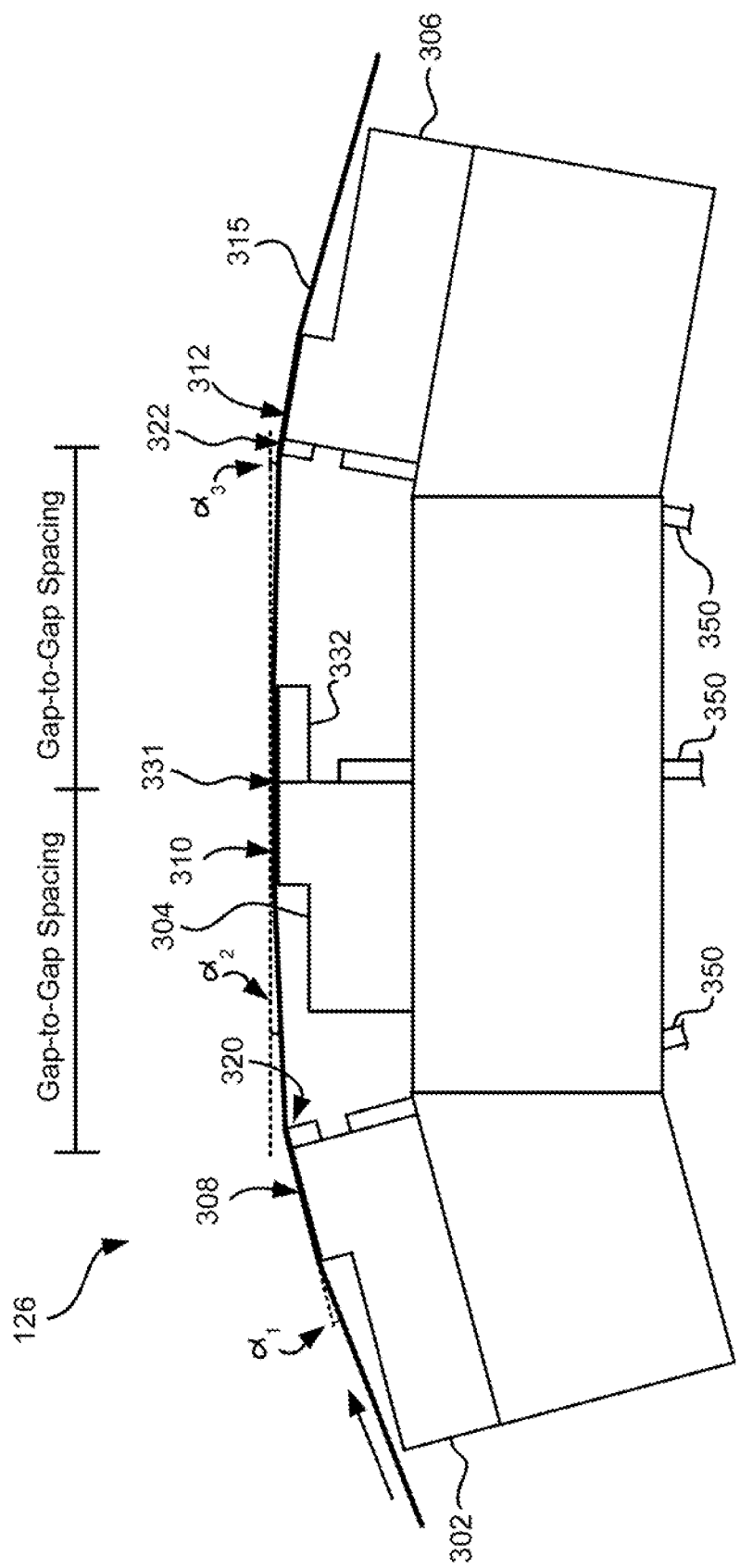
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

Figure 8:
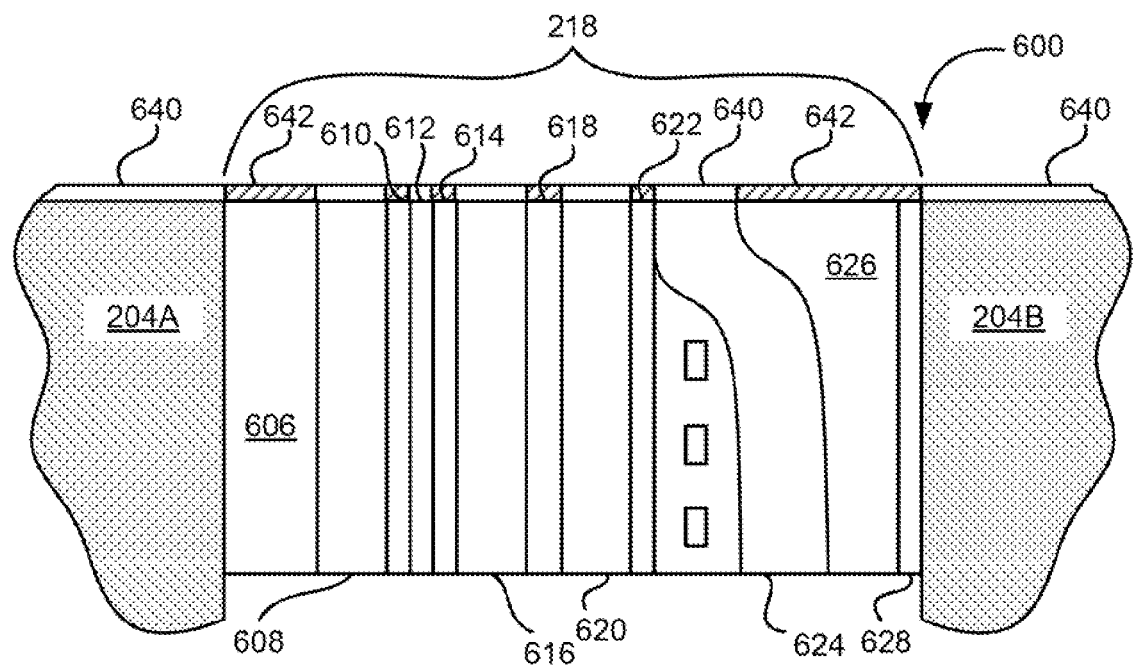
FIG. 8 is a schematic view of a portion of a magnetic head according to one embodiment.

A magnetic head according to one embodiment has a protective coating thereon. The magnetic head according to various approaches may be configured as described herein, and/or in any conventional configuration. Referring to FIG. 8, there is shown a magnetic head 600 having a gap 218 is shown according to one embodiment. The substrate 204A and closure 204B may form portions of a media bearing surface, and may further define a thin film region which may include multiple thin films which may reside in a gap, such as gap 218 shown in FIG. 8. The gap 218 may include an array of transducers, including anisotropic magnetoresistive (AMR), giant magnetoresistive (GMR), tunneling magnetoresistive (TMR), or colossal magnetoresistive (CMR) sensors and/or writers, each separated by sufficient insulator layers, shield layers, and/or pole layers so that the array of transducers may function as readers and/or writers in read or write operations when used in a magnetic head. Moreover, any of the sensors may have a current-in-plane (CIP) or current-perpendicular-to-plane (CPP) configuration. The substrate and transducers, if not recessed relative to the substrate, may form portions of a planar tape media facing surface.

For exemplary purposes, several of these thin films are identified in FIG. 8, such as: undercoat insulation 606, first shield 608 which may be insulated from MR sensors 612 by one or more thin films 610, and a second shield 616 which may be insulated from sensors 612 by one or more thin films 614, including at least one insulator layer. In other approaches, shields 608, 616 may serve as the leads for the sensors 612. An non-insulating (or insulating) layer 618 may separate a second shield 616 from a first pole 620. Another layer 622, often forming the write transducer gap, may separate the first pole 620 from a second pole 624 in the gap region. An overcoat insulator layer 626 may be followed by a bondline 628 near the closure 204B. There may also be other thin films and the overall design and ordering of these thin films is for illustrative purposes only, and in no way should limit the invention, nor should the inclusion of the substrate 204A and closure 204B in this description. The gap 218 may be comprised of more or less layers than is described in this example, and additional layers not mentioned here may be included to expand, adjust, or limit the functionality of the sensor array 612. Also, additional sensor arrays 612 may be included in the gap 218.

An at least partially polycrystalline dielectric layer 640 is formed on the media facing surface. In one approach, the at least partially polycrystalline dielectric layer is on at least a magnetic film of at least one transducer in the array. The magnetic film may be a write pole 620, 624 of a write transducer, a free layer of a sensor 612, etc. In a piggyback head having both a reader and a write transducer, as shown, the at least partially polycrystalline dielectric layer may be formed only on a layer of the writers, only a layer of the readers, or on a layer of both the readers and writers.

During formation of the at least partially polycrystalline dielectric layer 640, amorphous sections 642 may also form above nonmagnetic portions of the gap 218. Moreover, as described in more detail below, processing parameters can be used to selectively enable formation of the at least partially polycrystalline dielectric layer or an amorphous layer on the substrate 204A and closure 204B.

The at least partially polycrystalline dielectric material is selected from a group consisting of oxides of aluminum and oxides of chromium. By way of example only, and for aiding the reader, several embodiments are described as using aluminum. For example, one embodiment implements an at least partially polycrystalline aluminum oxide, and thus stoichiometric, film that is approximately as wear resistant as an AlTiC substrate.

A critical aspect for forming the at least partially polycrystalline dielectric film is ensuring that the media facing surface is exposed to ionized oxygen (O+) either prior to or during the formation of the at least partially polycrystalline dielectric, e.g., crystalline aluminum oxide. This causes formation of iron oxide on the media facing surface. O+ plasma energy level, flow rate and duration determine the quality of the resultant films. Alumina deposition may be via oxygen reaction of sputtered aluminum or alternatively via sputtering an alumina target. Without wishing to be bound by any theory, it is hypothesized that a mechanism for the formation of a polycrystalline versus an amorphous film may be the thermally favorable replacement of at least some of the Fe in $Fe_2O_3$ by Al (known as a thermite reaction), where the Al replaces some of the Fe in the iron oxide, which in turn enables formation of the at least partially polycrystalline dielectric layer on the surface. In this case, the hexagonal crystal structure of $Fe_2O_3$ may promote hexagonal aluminum oxide due to its similar crystal structure. In the case of sputtering an alumina target, free aluminum in the sputtered species (e.g., Al+, O+, $O_2$, $Al_2O_3$, etc.) is conjectured to drive the replacement process.

A magnetic film of one or more of the transducers may include iron or an iron-containing material such as sendust (e.g., sintered Al—Fe—Se) and NiFe. Thus, portions of the transducers adjacent the at least partially polycrystalline dielectric layer may have iron oxide and reaction products of a thermite-like reaction (where a thermite-like reaction is meant to encompass a thermite reaction), e.g., in a region thereof near the interface of the at least partially polycrystalline dielectric layer.

During fabrication, row bars of lapped heads that are ready for this process may be placed on a tray or pallet and inserted in a vacuum chamber.

A method for forming an at least partially polycrystalline dielectric layer on a media facing surface of a magnetic head according to one embodiment includes forming an at least partially polycrystalline dielectric layer on an array of transducers of a magnetic head, wherein at least some of the magnetic layers of the transducers are oxidized before and/or during the forming of the at least partially polycrystalline dielectric layer. This can be achieved by exposing the media facing surface to ionized oxygen (O+) either prior to or during the formation of the at least partially polycrystalline dielectric. In one approach, the exposure duration of O+ is adjusted to selectively oxidize an iron component of at least one of the magnetic films principally to the form of at least $Fe_2O_3$ prior to forming the at least partially polycrystalline dielectric layer. In general, the depth of $Fe_2O_3$ formation may be about 1 to 4 nm from the surface being exposed to the O+.

In any embodiment, the at least partially polycrystalline dielectric layer may have a deposition thickness of at least about 2 nm, e.g., 2 nm to about 30 nm or more.

Figure 9:
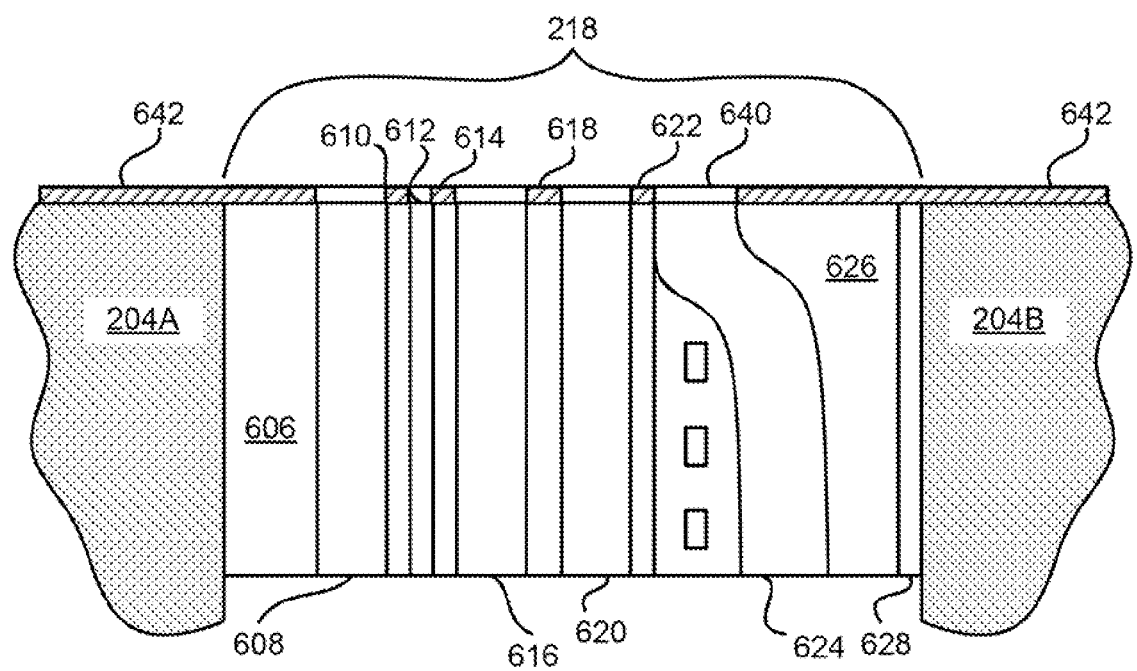
FIG. 9 is a schematic view of a portion of a magnetic head according to one embodiment.

In a particularly unique aspect of the present disclosure, the at least partially polycrystalline dielectric film can be selectivity formed on different regions of the tape bearing surface. This enables high wear resistance and extended head life in a tape drive. Referring to FIG. 9, in a variation of the embodiment of FIG. 8 and having common numbering therewith, the at least partially polycrystalline layer is present above the transducers and not above the substrate 204A or closure 204B. Rather, the material above the substrate 204A or closure 204B is amorphous. How this unique selectivity is enabled is presented below.

Prior to forming the at least partially polycrystalline aluminum oxide film, the tape bearing surface may be etched, as by ion-milling at a predetermined milling angle. The milling may be tailored to recess the gap films relative to the tape support portions (substrate 204A or closure 204B) of the head. In addition, the milling angle affects the relative ease of polycrystalline aluminum oxide formation on the aluminum oxide component of the AlTiC tape support surfaces, wherein a more grazing angle promotes polycrystalline growth relative to a more normally incident angle. Oxygen (O+) plasma may also assist in crystallizing Al2O3 that adheres to the substrate and closure, particularly for the 15° milling angle.

Figure 10:
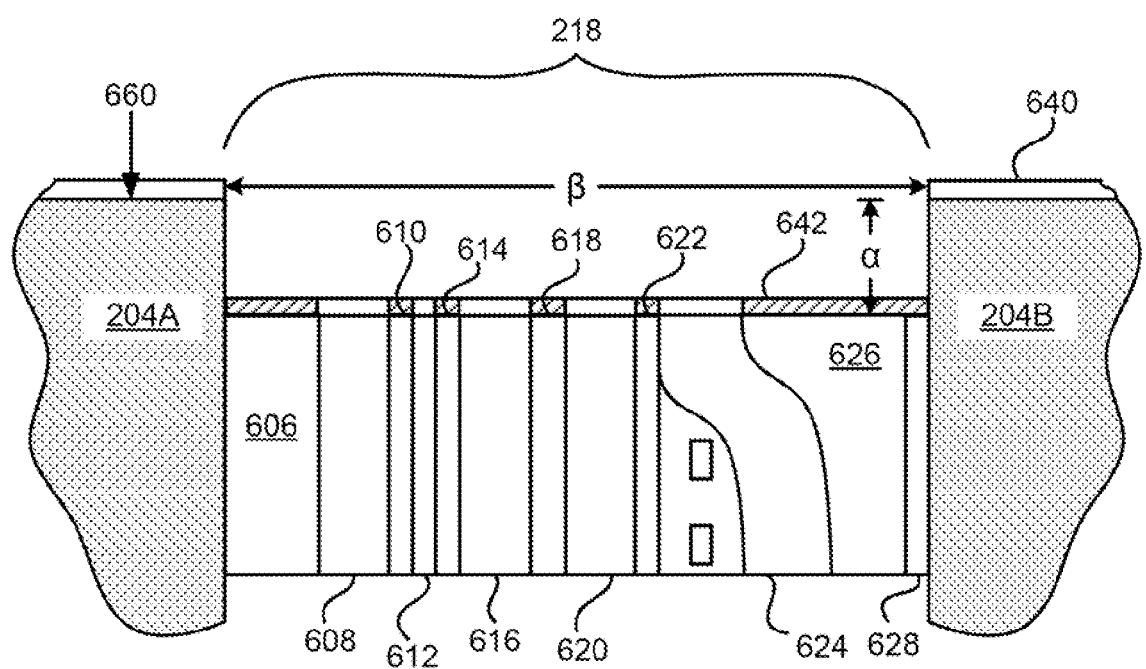
FIG. 10 is a schematic view of a portion of a magnetic head according to one embodiment.

Referring to FIG. 10, having common numbering with FIG. 8, there is shown a head where the gap 218, including the transducers, is recessed from the media facing surface 660 of the substrate 204A prior to oxidizing the surface and forming the at least partially polycrystalline dielectric layer 640.

The distance α that the gap 218 is recessed may be selected based on factors such as the subsequent coating wear resistance and gap width β. Preferably, the gap 218 may be recessed by a distance α of between about 2 nm. and about 50 nm., more preferably between about 5 nm. and about 20 nm. However, more or less recession may be used depending on the individual characteristics of the gap 218, coating, and magnetic head. Moreover, though all layers in the gap are shown as having the same amount of recession, those skilled in the art will recognize that the amount of recession of a particular layer will depend on a variety of factors such as milling angle, relative milling rates of the materials, etc.

In some embodiments, the gap 218 may be recessed using mechanical or chemical-mechanical processing, milling, etching, and other techniques which are used in the art of thin film processing, as will be understood by those having ordinary skill in the art.

In one particularly preferred embodiment, the gap 218 is recessed using ion-milling, a technique used in the art of thin film processing, as would be understood by those having ordinary skill in the art. An illustrative ion milling step may include milling with an argon plasma or directional argon beam.

The angle of milling not only affects the rate of recession of the various layers, which may each have a unique rate versus angle curve, but also determines whether the material that forms above the substrate 204A is at least partially polycrystalline dielectric material or amorphous material.

Milling the substrate at a grazing angle of greater than 45°, e.g., 45° to 75°, relative to normal to the media facing surface promotes polycrystalline growth of the at least partially polycrystalline dielectric material, while milling the substrate at an incident angle of less than 45° relative to normal to the media facing surface retards polycrystalline growth of an at least partially polycrystalline dielectric layer on the substrate. A similar effect would be observed on the closure 204B if the closure is constructed of a similar material as the substrate.

Note that the foregoing appears to be achievable if performed in the last portion of the milling operation. Thus, for example, milling at an incident angle (e.g., less than about 45°) may be performed for a majority of the time to recess the gap, followed by milling at a grazing angle (e.g., greater than about 45°) until the end of the milling process to promote formation of the at least partially polycrystalline dielectric layer.

While not wishing to be bound by any theory, it is believed that the angular dependence of growing polycrystalline aluminum oxide prefers a preexisting crystalline surface. It is believed that milling at a grazing angle tends to clean and cleave the surface in such a way that promotes the growth of aluminum oxide in a crystalline form. In contrast, if milling is conducted normally incident, it is believed that either impurities are driven into the surface or the crystal lattice of the substrate is damaged further.

It has also been surprisingly found that pre oxidizing surfaces milled at an incident angle with an oxygen plasma causes the surfaces to recover and become highly likely to grow crystalline aluminum oxide.

Accordingly, presence of $O^+$ oxygen plasma, which oxidizes the iron in the substrate and closure, and may enable the thermite-like reaction that is performed later, can also, surprisingly, be used to recover the damage that was caused by milling at a certain angle on the other parts of the head.

After formation, the at least partially polycrystalline dielectric layer may optionally be planarized by lapping, chemical-mechanical polishing, kiss lapping, tape lapping, etc.

There has thus been described a protective coating for magnetic recording heads. It has the advantage that it can be applied as a post wafer process to magnetic recording heads built using conventional films and processes.

It will be clear that the various features of the foregoing methodologies may be combined in any way, creating a plurality of combinations from the descriptions presented above.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
a substrate;
an array of transducers formed on the substrate, wherein the transducers and substrate form portions of a magnetic media facing surface; and
an at least partially polycrystalline dielectric layer on the media facing surface,
wherein the at least partially polycrystalline dielectric layer is on a magnetic film of at least one of the transducers in the array,
wherein portions of the transducers adjacent the at least partially polycrystalline dielectric layer have at least one of iron oxide and reaction products of a thermite-like reaction.

2. A head as recited in claim 1, wherein the at least partially polycrystalline dielectric layer includes a material selected from a group consisting of oxides of aluminum and oxides of chromium.

3. A head as recited in claim 1, wherein the at least partially polycrystalline layer is present above the transducers and not above the substrate.

4. A head as recited in claim 1, wherein the at least partially polycrystalline dielectric layer has a deposition thickness of at least about 2 nm.

5. A head as recited in claim 1, wherein portions of the transducers adjacent the at least partially polycrystalline dielectric layer have the iron oxide and the reaction products of a thermite-like reaction.

6. A head as recited in claim 1, wherein the magnetic film of the at least one of the transducers include a material selected from a group consisting of sendust, Fe, and NiFe.

7. A data storage system, comprising:
a magnetic head as recited in claim 1;
a drive mechanism for passing a magnetic medium over the magnetic head; and
a controller electrically coupled to the magnetic head.

8. A magnetic head, comprising:
a substrate having a media facing surface;
an array of transducers formed on the substrate; and
an at least partially polycrystalline dielectric layer above the array of transducers,
wherein portions of the transducers adjacent the at least partially polycrystalline dielectric layer have iron oxide and reaction products of a thermite-like reaction.

9. A head as recited in claim 8, wherein the at least partially polycrystalline dielectric is selected from a group consisting of oxides of aluminum and oxides of chromium.

10. A head as recited in claim 8, wherein the at least partially polycrystalline layer is present above the transducers and not above the substrate.

11. A head as recited in claim 8, wherein the at least partially polycrystalline dielectric layer has a deposition thickness of at least about 2 nm.

12. A head as recited in claim 8, wherein the transducers in the array include a magnetic film selected from a group consisting of sendust, Fe, and NiFe, wherein the at least partially polycrystalline dielectric layer is on the magnetic film.

13. A data storage system, comprising:
a magnetic head as recited in claim 8;
a drive mechanism for passing a magnetic medium over the magnetic head; and
a controller electrically coupled to the magnetic head.

14. A method for forming an at least partially polycrystalline dielectric layer on a media facing surface of a magnetic head, the method comprising:
forming an at least partially polycrystalline dielectric layer on an array of transducers of a magnetic head, wherein an oxide layer is formed above at least some of the magnetic layers before and/or during the forming of the at least partially polycrystalline dielectric layer.

15. A method as recited in claim 14, wherein the magnetic layers of the transducers adjacent the at least partially polycrystalline dielectric layer have iron oxide and reaction products of a thermite-like reaction.

16. A method as recited in claim 14, further comprising recessing the transducers from the media facing surface of a substrate of the magnetic head prior to forming the at least partially polycrystalline dielectric layer.

17. A method as recited in claim 14, further comprising milling a substrate of the magnetic head at a grazing angle for promoting polycrystalline growth of the at least partially polycrystalline dielectric layer on the substrate.

18. A method as recited in claim 14, further comprising milling a substrate of the magnetic head at an incident angle for retarding polycrystalline growth of the at least partially polycrystalline dielectric layer on the substrate.

19. A method as recited in claim 14, wherein the magnetic layers of the transducers are oxidized to form iron oxide prior to forming the at least partially polycrystalline dielectric layer.

* * * * *